Aug. 29, 1967        J. ANGELOS        3,338,156
CONTINUOUS FLOW APPARATUS FOR RECEIVING, TRANSPORTING, BROILING
AND DISCHARGING FOOD OBJECTS
Filed Oct. 18, 1965        3 Sheets-Sheet 1

INVENTOR.
JACK ANGELOS

Aug. 29, 1967     J. ANGELOS     3,338,156
CONTINUOUS FLOW APPARATUS FOR RECEIVING, TRANSPORTING, BROILING
AND DISCHARGING FOOD OBJECTS
Filed Oct. 18, 1965     3 Sheets-Sheet 2
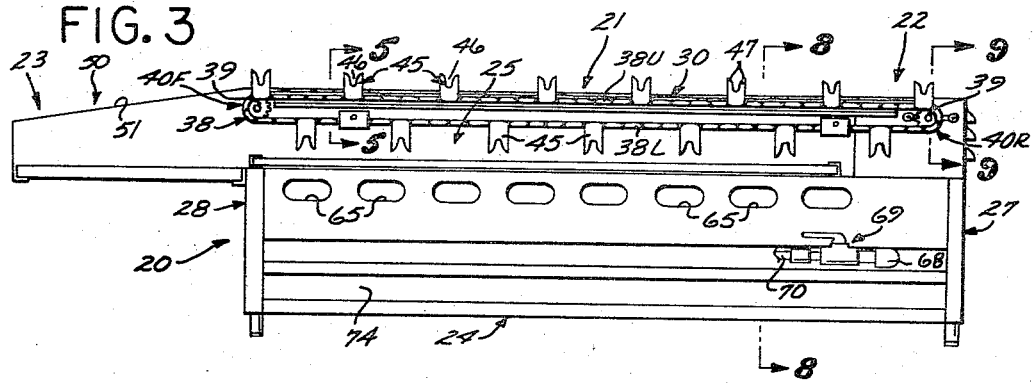
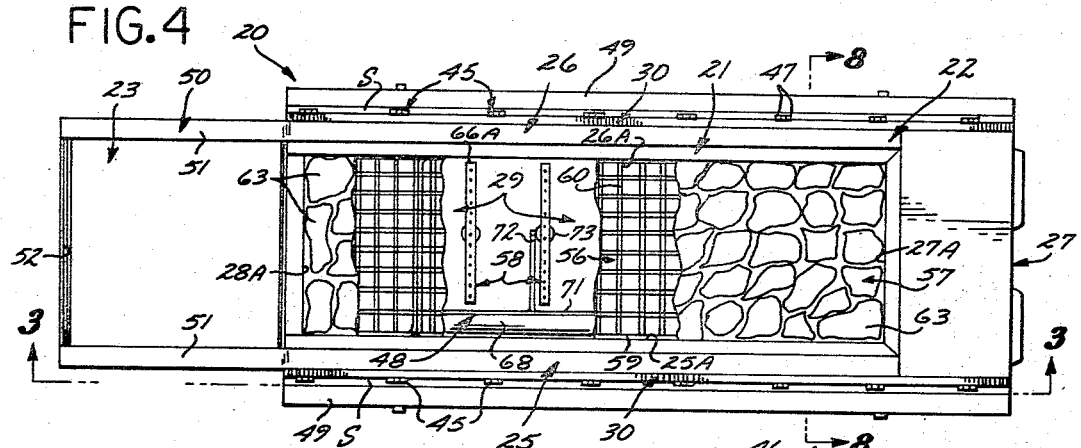
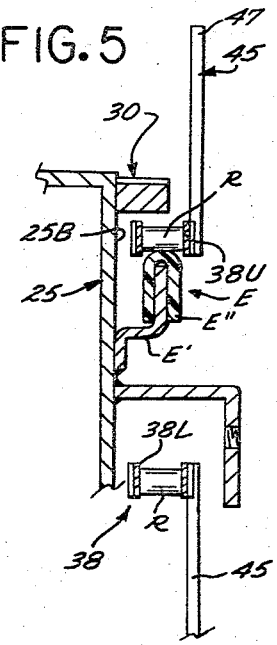
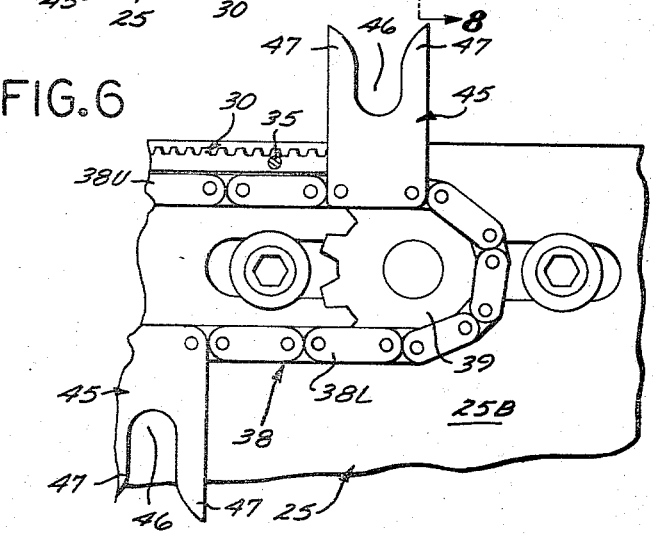
INVENTOR.
JACK ANGELOS Aug. 29, 1967    J. ANGELOS    3,338,156
CONTINUOUS FLOW APPARATUS FOR RECEIVING, TRANSPORTING, BROILING
AND DISCHARGING FOOD OBJECTS
Filed Oct. 18, 1965    3 Sheets-Sheet 3
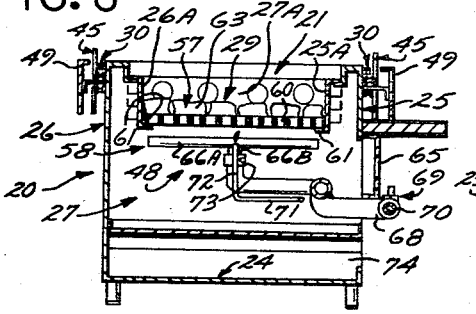
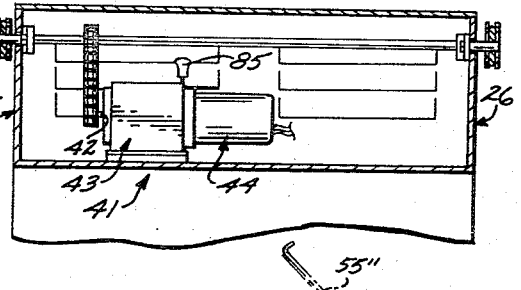
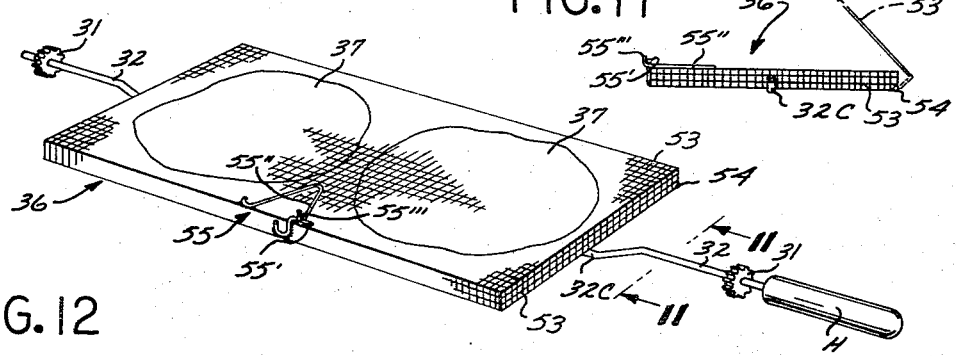
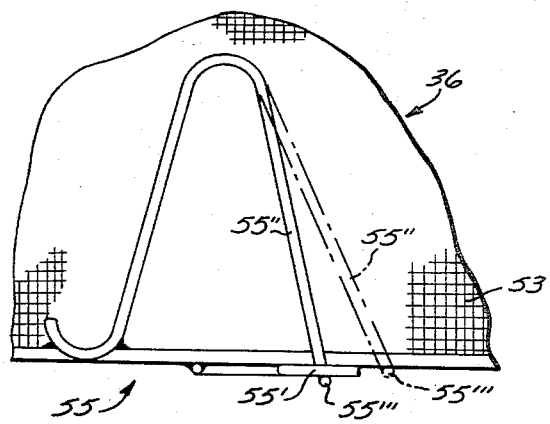
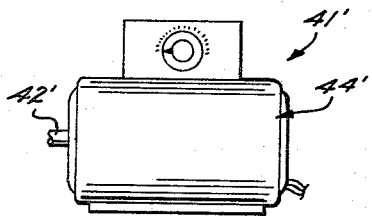
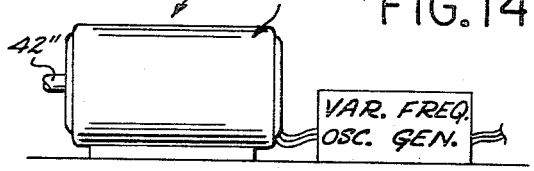
INVENTOR.
JACK ANGELOS United States Patent Office 3,338,156
Patented Aug. 29, 1967

3,338,156
CONTINUOUS FLOW APPARATUS FOR RECEIVING, TRANSPORTING, BROILING AND DISCHARGING FOOD OBJECTS
Jack Angelos, % Ancor Corp., 4427 Collis St., Los Angeles, Calif. 90032
Filed Oct. 18, 1965, Ser. No. 497,385
5 Claims. (Cl. 99—427)

ABSTRACT OF THE DISCLOSURE

The specification discloses cooking apparatus primarily intended for barbecuing or broiling meat, although not specifically so limited, and which includes means for mounting a plurality of food objects, such as pieces of meat, at intervals with respect to a pair of endless-loop similarly driven chains, belts or the like, so as to transport the plurality of food objects across a heated cooking region or zone while the food objects turn thus producing a very effective cooking thereof. The cooked food objects are discharged just beyond the downstream end of the heated cooking region or zone for removal by the chef or cook. The specification discloses a combination of elements comprising apparatus adapted to perform the functions just described and, in addition, discloses specific and detailed particulars of certain portions or elements of the apparatus having particular advantages as a part of the complete combination form of the apparatus and/or individually.

---

Generally speaking, the present invention relates to the cooking apparatus art and, more particularly, pertains to a continuous flow type of cooking apparatus adapted to receive adjacent an inlet end a transverse rod carrying a food object and to slowly transport it through a cooking region to an outlet end where it is automatically discharged, it being understood that the apparatus is adapted to sequentially receive and sequentially transport through said cooking zone any number of such transverse food-object supporting rods since the apparatus operates on a continuous-flow principle.

Also, it should be noted that in one preferred form of the invention, the apparatus includes means for rotating each of the food objects as it is transported through the cooking region or zone, thus effectively causing all portions of the food object to be properly cooked. This is particularly important where the food object is meat which is to be broiled, since the meat juices will not have time to drop off of the bottom of the meat food object being broiled but will be retrieved and caused to run back over the meat food object repeatedly as a result of the rotating action thereof in what might be termed a self-basting manner, thus causing the meat food object, when fully broiled and discharged at the discharge end of the apparatus, to be flavorful and juicy in a highly advantageous manner. This occurs primarily because virtually none of the meat juices has been lost.

It should be noted that the continuous flow feature of the present invention provides an arrangement capable of cooking a large quantity of food objects such as meat or the like, although not specifically so limited, in a relatively short period of time and thus is particularly well adapted for restaurant use where heavy temporary customer overloads occur at peak hours.

For example, in a bus terminal, or the like, or where a prescribed noon lunch hour (or other specific mealtime period) is available for a large number of persons, they may all arrive at the restaurant at substantially the same time and perhaps order hamburgers or the like. Normally, it is difficult to fill such a large number of orders within the required period of time and a certain number of customers may be lost. In any event, this factor normally limits the volume of business which can be handled during such peak hours.

However, with the apparatus of the present invention, a very large volume of meat food object cooking orders, such as for hamburgers, wieners, steaks, or the like, may be handled in a very short period of time by reason of the continuous flow aspect of the apparatus of the present invention. It will be understood that this is a great advantage to the restaurant owner.

Additionally, it should be noted that, by reason of the self-basting action of the apparatus of the present invention and by reason of the fact that it includes heating means and refractory means carried thereabove in the cooking region and adapted to receive, absorb, and re-radiate heat into said cooking zone or region, the apparatus of the present invention produces very much less smoke and fumes than conventional prior art restaurant-type grills for cooking hamburgers, wieners, steaks, and the like.

Furthermore, it should be noted that the temperature in the cooking zone or region may be controlled by temperature regulator or "thermostat" means in a manner such as to adapt the apparatus for cooking various different types of food objects.

Also, a variation in the effective cooking of an object may be accomplished by placing it on the continuously moving linear movement means or transport portion of the apparatus of the present invention at greater or lesser distance from the outlet or discharge end of the apparatus in accordance with the greater or lesser cooking time required by the particular food object. In certain forms of the invention, the speed of movement of the linear movement means or transport portion of the apparatus, which moves the food objects along, may also be controlled so as to be adjusted to an optimum value for a particular type of food object which is to be cooked. This may be accomplished by means of a variable speed driving motor, by means of a controllably variable ratio power-transmission means (usually variable ratio gear means, although not specifically so limited) effectively connected between such a motor means and the linear movement means or transport portion or other comparable arrangement.

It is an object of the present invention to provide continuous flow cooking apparatus in accordance with any of the features referred to above and adapted for receiving, transporting, cooking, and discharging food objects (usually meat food objects, although not specifically so limited), with the cooking operation usually comprising broiling or barbecuing and occurring simultaneously with and during the transporting operation.

It is a further object to provide apparatus of the character referred to above wherein each of the plurality of transverse supporting rods is provided with controllably openable food-object-retaining means carried by the center (or other appropriately located) portions of corresponding ones of said transverse rods in a manner usually, though not necessarily in all cases, extending downwardly into the cooking region or zone and adapted to rotate as it passes therethrough toward the outlet end thereof. It should be noted that, in one preferred form of the invention, the above-mentioned food-object-retaining means may comprise one or more basket means adapted to be permanently carried (although not specifically so limited) by corresponding portions of the corresponding ones of said transverse rods at locations directly superimposable over the above-mentioned cooking region or zone as said rods and said basket means rotate thereover during movement from the inlet end of the apparatus toward the outlet end thereof. However, this is illustrative only of one form of the invention, and it should be clearly understood that the invention is not specifically limited to this precise structural arrangement.

In one preferred exemplary form of the invention, each of said rods, at the region thereof carrying a corresponding one of said basket means, may be offset from a longitudinal central axis of the remaining portions of said rod whereby to so position said basket means as to cause a longitudinal central axis thereof to be coincident with said longitudinal central axis of said remaining portions of said rod, thus causing opposite surfaces of a flat food object clamped in said basket means to be alternately rotated into positions substantially equi-distant from the heated refractory means carried in the hereinbefore-mentioned cooking region so that said opposite surfaces of said food object will be equally cooked as the rod and basket means rotates during horizontal movement from the inlet end of the apparatus toward the outlet end thereof through said cooking region or zone and above said heated refractory means.

It is a further object to provide apparatus of the character set forth above, wherein the linear movement means or transport portion or means comprises a horizontally positioned effectively endless-loop sprocket chain means having an inlet portion thereof adjacent to said inlet end of said apparatus and having an outlet portion adjacent to said outlet end of said apparatus, with said inlet and outlet portions of said endless-loop sprocket chain being carried by an inlet sprocket wheel means and an outlet sprocket wheel means longitudinally spaced apart and with intervening portions of said endless-loop sprocket chain means having the upper portion thereof carried by an underlying longitudinal supporting edge means engaging roller portions of said sprocket chain means and positively supporting same against downward sagging movement thereof under the action of gravity. At least one of said sprocket wheel means comprises driving means connected to suitable driving motor means for causing continuous forward movement of said supported upper portion of said endless-loop sprocket chain means between the inlet portion and the outlet or discharge portion of the continuous flow cooking apparatus of the present invention.

It is a further object of the present invention to provide apparatus of the character set forth in the preceding object, wherein there are two such similar endless-loop sprocket chain means, each carried by an inlet sprocket wheel means and a longitudinally spaced outlet sprocket wheel means in the manner described in the preceding object and with the upper portion of each of said endless-loop sprocket chains being continuously longitudinally slidably supported along the underside of substantially the complete length thereof by corresponding upwardly directed horizontal longitudinal support edge means rollably slidably engaging the corresponding rollers of said corresponding upper sprocket chain portions in the manner described in the preceding object with respect to only one of said sprocket chains.

It is a further object to provide apparatus of the character set forth in the preceding object wherein the cooking zone or region is effectively surrounded at the bottom and sides by trough means extending from the inlet portion of the apparatus to the outlet or discharge portion thereof, with said trough means being provided with effective rack means therealong and with each of said transverse food object-supporting rods being provided with rotary engagement means (usually effectively comprising pinion or spur gear means, although not specifically limited thereto) adapted to engage and roll along the effective rack means whereby to impart rotary movement to each of said transverse food object-supporting rods in a manner effectively rotating same and any food objects carried thereby as each is carried along the length or partial length of the trough means by linear movement engaging means effectively engaged with respect to the rods by notched rod-supporting means, each of which is open at the end remote from the endless-loop sprocket chain means.

It is a further object to provide apparatus of the character set forth in the preceding object including downwardly inclined gravity-type discharge means at the discharge or outlet end of the trough means and the endless-loop sprocket chain means adapted to receive and downwardly angularly rollably discharge each transverse food object-supporting rod as it is released from effective driven engagement with respect to the notched rod-supporting means carried by the sprocket chain means as it passes a forward movement-reversing sprocket wheel carrying said endless-loop sprocket chain means.

It is a further object to provide apparatus of the character set forth in any of the preceding objects wherein heating means is positioned adjacent the bottom of the trough means and comprises burner means for combustible fuel and perforate false bottom means of said trough comprising effective grate means positioned above said burner means and carrying refractory means comprising a plurality of briquets (or the like) effectively vertically apertured and adapted to receive and adsorb heat from the underlying burner means and to re-radiate heat upwardly into the heating or cooking zone or region within the upper portion of the trough means.

It is a further object to provide apparatus of the character set forth in any of the preceding objects including means for controllably adjusting the speed of movement of the linear movement, endless-loop sprocket chain means.

It is a further object to provide apparatus of the character referred to in any of the preceding objects including controllably removable drip pan means underlying the perforate false bottom or grate means of the trough and underlying the heating means for the controllable removal of any grease drippings which may escape during the self-basting action of the meat food objects carried b ythe transverse supporting rods.

It is a further object to provide apparatus of the character referred to in any of the preceding objects wherein each of the basket means previously mentioned is of a type having a novel fastener, latch, or catch means which can be very readily opened without touching same with one's fingers. In other words, by holding the insulated handle of the transverse rod carrying one of said basket means at the offset center portion thereof, the catch or latch may be moved into a position such that it may be forced against the edge of the side wall of the trough means of the barbecuing apparatus in a manner which will readily disengage said catch or latch means and allow the basket means to open. This is important since it will be understood that the basket means becomes very hot as a result of passing through the heated cooking zone or region, and manually attempting to open the fastener, catch, or latch means would normally result in burning one's fingers.

It is a further object to provide apparatus of the character referred to in any of the preceding objects wherein the trough means is provided with a false inner liner means spaced inwardly from side and end walls of the U-shaped trough means and adapted to carry the previously-mentioned perforate false bottom or grate means at the bottom thereof, thus defining an additional protective air space between said false inner liner means and the side and end wall means of the U-shaped trough means which has a protective function and prevents heat-caused damage from occurring to said side and end wall means of said trough means. Also, said false or inner liner structure, and including the bottom positioned perforate false bottom or grate means, may be removed from within the remainder of the U-shaped trough means for easy cleaning.

It is a further object to provide continuous flow cooking apparatus of the character referred to in any of the preceding objects which is of relatively simple, foolproof, easy-to-maintain, easy-to-clean construction such as to be conducive to widespread use thereof.

Further objects are implicit in the detailed description which follows hereinafter for exemplary rather than limiting purposes and will be apparent to persons skilled in the art after a careful study thereof.

For the purpose of clarifying the nature of the present invention, one exemplary embodiment of the invention and several modifications of the driving means therefor are illustrated in the hereinbelow-described figures of the accompanying drawings and are described in detail hereinafter.

FIG. 3 is a side elevational view as seen from the near side of the apparatus illustrated in FIG. 1, taken substantially on the plane indicated by the arrows 3—3 of FIG. 4, but with the single transverse rod and basket means shown near the left end of the apparatus of FIG. 1 being completely removed from FIG. 3 for reasons of drawing simplicity and clarity.

FIG. 4 is a fragmentary, partially-broken-away top plan view of the apparatus as shown in FIG. 3 with various horizontal levels being shown as a result of the device being broken away at different horizontal levels.

FIG. 5 is an enlarged fragmentary cross-sectional view taken substantially along the plane indicated by the arrows 5—5 of FIG. 3 and illustrates the novel arrangement provided at each side of the U-shaped trough means for longitudinally supporting the upper portion of each of the two laterally spaced endless-loop sprocket chain means continuously along substantially the complete length thereof in a manner which is highly advantageous considering the temperature extremes and the corresponding contraction and expansion of said endless-loop sprocket chain means which occurs during and between successive cooking operations of the barbecuing apparatus—the support arrangement completely replacing intervening gears or sprocket wheels along the intervening length of each of the endless-loop sprocket chain means.

FIG. 6 is an enlarged fragmentary elevational view of the rear end (actually the right end as shown in FIG. 3) of the near endless-loop sprocket chain shown in FIG. 3 and illustrates the detailed structure of the various elements positioned in that region.

Figure 1:
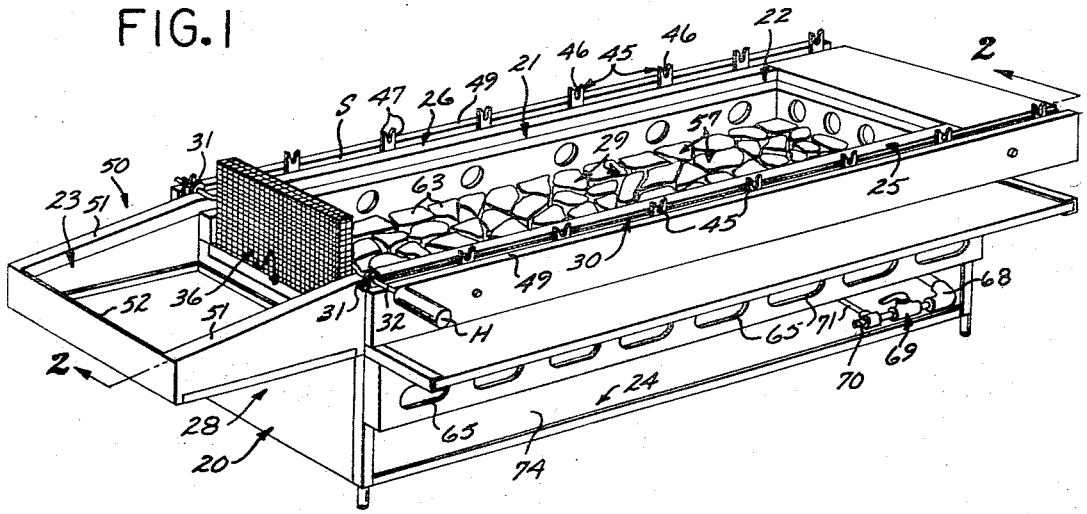
FIG. 1 is a greatly-reduced-size perspective view of one exemplary embodiment of the present invention in fully assembled operative condition.
Figure 2:
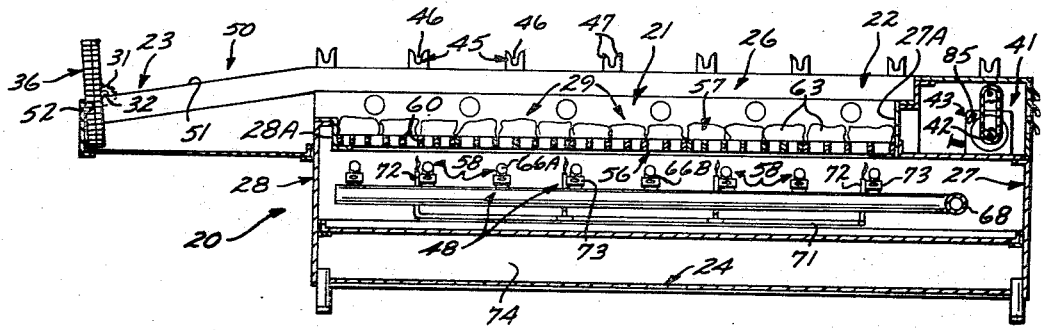
FIG. 2 is a side view, largely in section (although certain portions are shown in side elevation) taken substantially along the plane indicated by the arrows 2—2 of FIG. 1 and with certain portions removed for reasons of drawing simplicity and clarity.
Figure 7:
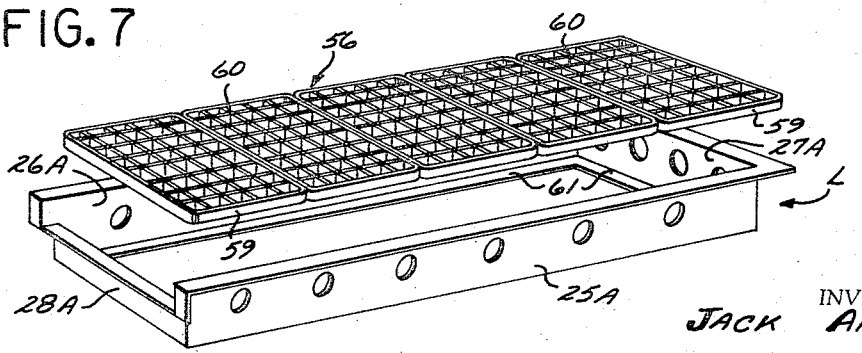

FIG. 7 is an exploded three-dimensional view showing the removable false inner liner means defining the inner portion of the U-shaped trough means and the removable perforate false bottom or grate means normally adapted to lie across the bottom of said false inner liner of the U-shaped trough means and normally adapted to carry on the upper surface thereof the refractory means clearly shown in FIGS. 1 and 2.

FIG. 8 is a cross-sectional view taken substantially on a plane such as is indicated by the arrows 8—8 of FIGS. 3 and 4. Certain portions of the apparatus are removed for reasons of drawing simplicity and clarity.

FIG. 9 is an enlarged fragmentary view, partly in elevation and partly in section, taken substantially along the plane indicated by the arrows 9—9 of FIG. 3.

FIG. 10 is an enlarged three-dimensional view of one exemplary form of one of the plurality of food object-retaining baskets carried by the offset central portion of a corresponding one of the plurality of transverse rods, each of which has an insulating handle similar to the one illustrated as being at the near end of the transverse rod shown in FIG. 10. In this view, the basket is shown in closed food object-retaining relationship.

FIG. 11 is a view taken substantially in the direction of the arrows 11—11 of FIG. 10 but shows the basket in opened relationship with the food objects removed therefrom.

FIG. 12 is a greatly enlarged top plan view of the fastener, latch, or catch means shown at the middle of the near edge of the basket means illustrated in FIG. 10 and shows same in full or solid lines in latched relationship and shows same in phantom lines in resiliently deflected unlatched relationship.

FIG. 13 is a fragmentary, partially-broken-away, somewhat diagrammatic view illustrating a modified controllably speed-variable driving means adapted to drive the sprocket chain drive shaft shown in FIG. 9 at a selected adjustable rate of rotation.

FIG. 14 is another view generally similar to FIG. 13 but illustrating another slight modification of the controllably speed-variable driving means of both FIG. 9 and FIG. 13.

Referring to the figures for exemplary purposes, one illustrative embodiment of the invention takes a typical exemplary form wherein it comprises supporting framework means, indicated generally at 20, defining a longitudinal substantially U-shaped trough means, indicated generally at 21, having an inlet portion or region, indicated generally at 22, and an outlet or discharge portion or region, indicated generally at 23, at opposite ends thereof.

The framework means includes a bottom wall means, indicated generally at 24, two side wall means, indicated generally at 25 and 26, one upstanding end wall means indicated generally at 27 and a partial end wall means indiacted generally at 28. Each of these wall means, in at least the upper portions thereof, comprises effectively inner and outer wall portions designated by the same reference numeral, followed by the letter A in the case of inner wall portions and followed by the letter B in the case of outer wall portions. The effective air space between said inner and outer wall portions effectively comprises insulating means which is designated by the same reference numeral, followed by the letter C, however. It should be noted that each of said inner wall portions 25A, 26A, 27A, and 28A are joined together to comprise one removable integral unit which may be said to comprise a false inner liner means and which is generally designated by the reference character L, as is best shown in FIG. 7.

It will be noted that the U-shaped trough means 21 is effectively defined by the inner bottom wall portion 24A, the inner side wall portions 25A and 26A, the inner inlet end wall portion 27A and the inner outlet end partial wall portion 28A. The upper portion of the region enclosed therein may be said to comprise the cooking region or zone designated generally by the reference numeral 29 and is the region through which the food objects (which will be described hereinafter as meat, although not specifically so limited) will be transported while simultaneously being cooked—this being done in a manner described in greater detail hereinafter.

The trough means 21 is provided with effective rack means, designated generally at 30, for imparting rotation to the gears 31 of the transverse food object-supporting rods indicated at 32.

In the specific example illustrated, the rack means 30 are two in number and are carried along outside surfaces of side walls 25B and 26B adjacent the tops thereof by threaded fastener means 35 connected thereto.

Each of the plurality of transverse rods 32 has one of the pinion or spur gears 31 at a location such as to be capable of resting upon the corresponding rack 30 in the manner best shown in FIGS. 1, 3, 4, and 6, with the intermediate or central portion of the rod 32 positioned directly across the top of the heating or cooking region or zone 29 and carrying at said location a corresponding food object-retaining basket, such as is indicated generally at 36, which is adapted to be controllably openable and closable whereby to receive one or more food objects, such as the two hamburgers shown at 37, therein whereby they will be rotated as the gears 31 roll along the two rack portions 30 from the inlet end of the trough 22 toward the outlet or discharge end 23 thereof.

Each of the transverse rods 32 has a manually graspable handle means H for use in placing it in engaged relationship for transport along the rack means 30 and for handling same after it has been discharged at the discharge end 23.

Each of the transverse rods 32 has a centrally displaced or offset portion 32C which is fixed, such as by welding, or the like, to one surface of the corresponding basket 36 in a manner such as to align an imaginary central longitudinal axis of the basket 36 with the non-offset front and rear portions of the transverse rod 32, thus causing even heating of opposite surfaces of the flat food objects 37 carried within the basket 36, to occur during rotary movement through the cooking zone or region 29.

The trough means 21 is provided with linear movement engagement means adapted to continuously drive the plurality of transverse support rods 32 (when effectively engaged with respect thereto) in a direction from the inlet portion 22 of the trough means 21 toward the outlet portion 23 thereof.

In the specific example illustrated, said linear movement engagement means is designated generally by the reference numeral 38 and comprises two laterally spaced endless-loop sprocket chain means 38 each having an upper portion 38U and a lower portion 38L and with each of said sprocket chain means 38 being mounted on a pair of longitudinally spaced sprocket wheels 39 effectively comprising, at the right end of the apparatus shown in FIG. 3, an inlet sprocket wheel and effectively comprising, at the left end of the apparatus shown in FIG. 3, an outlet sprocket wheel 39, carried at said longitudinally horizontally spaced locations by the outer side wall portions 25B and 26B adjacent to the tops thereof whereby to mount each of said endless-loop sprocket chain means 28 so that the upper longitudinal horizontal portion 38U thereof is normally continuously supported along the underside of the complete length thereof by an upwardly directed horizontal longitudinal support edge means, generally designated by the reference character E, which rollably slidably engages the corresponding rollers R spaced along the length of said upper sprocket chain portion 38U so that when said upper sprocket chain portion 38U is driven forwardly to the linear movement-reversing discharge end thereof, indicated generally at 40F, it will pass around the forward or outlet sprocket wheel means 39 and it then becomes the corresponding lower chain portion 38L, which is driven rearwardly to the rear or inlet sprocket wheel means 39, where another linear movement-reversing action occurs, as indicated at 40R. Then the lower sprocket chain portion 38L again becomes the upper sprocket chain portion 38U and is again forwardly driven.

It should be noted that the horizontal longitudinal support edge means generally designated by the reference character E, as is perhaps best shown in FIG. 5 with respect to one of the two similar such structures, comprises an offset or substantially Z-shaped longitudinal bracket or extrusion member E' fastened by suitable welding, or the like, to the outer wall 25B and carrying along the top longitudinal horizontal edge thereof an inverted substantially U-shaped extruded anti-friction plastic sleeve member E'', which may be made of extruded "nylon" or any other suitable plastic material having suitable wear-resistance qualities and anti-friction qualities. It will be noted that this structure is highly advantageous since it continuously supports each of the upper sprocket chain portions 38U along substantially the complete length thereof and does so in a friction-minimizing manner and in a manner which is not in any way interfered with by reason of thermal expansion or contraction of the corresponding endless-loop sprocket chain means 38, as would be the case if each of said sprocket chain means 38 were supported at spaced intermediate points by a plurality of sprocket wheels or gears, which would allow sagging of intervening unsupported portions of the corresponding upper sprocket chain parts 38U to occur during thermal expansion and the opposite to occur during thermal contraction, which would result in thermal operating problems, which are completely met and overcome by the novel longitudinal horizontal continuous supporting structure E best shown in FIG. 5.

The driving of the sprocket chain means 38 is accomplished by driving means, indicated generally at 41, comprising two of the rear sprocket wheels 39 connected to drive shaft means 42 which is driven through suitable reduction gearing means 43 by driving electric motor means 44. The arrangement is preferably such that the output of the shaft 42 is of the order of two or three r.p.m., although not specifically so limited. Furthermore, in certain cases this may be controllably variable in order to arrange for different optimum cooking times for different food objects.

In the specific example illustrated, the means for controllably engaging each of the transverse rods 32 with respect to the sprocket chain means 38 comprises a plurality of notched rod-supporting means 45 normally carried in upwardly directed relationship by the upper sprocket chain portion 38U and each having a notch 46 therein open at the top and defined between a pair of spaced tines as indicated at 47 to facilitate the release of the corresponding rod 32 at the discharge end 23.

The arrangement is such that corresponding portions of each transverse supporting rod 32 can be placed in the notches 46 at the inlet portion 22 of the trough means 21 with the basket 36 carrying the meat food objects 37 therein.

Each succeeding notched rod-supporting means 45 may be similarly engaged with a food object-supporting rod 32 as it comes into the inlet location at 22. Thereafter, the slow forward movement of the upper portion 38U of the sprocket chain will move each rod 32 and the corresponding food objects 37 through the heated cooking zone or region 29 while simultaneously rotating the baskets 36 and the food objects 37 through a number of complete revolutions (preferably of the order of one complete revolution each 20 seconds, although not specifically so limited) and with the entire period of travel from the inlet portion 22 to the outlet portion 23 being of the order of five minutes (although not specifically so limited).

Thus it will be seen that the heated cooking zone or region 29, which is heated by the underlying heating means indicated generally at 48, will effectively cause the meat food objects 37 to arrive at the outlet portion or region 23 in fully cooked and self-basted condition ready for eating.

Each of the rods 32 will there be sequentially disengaged from the corresponding notched rod-supporting means 45 as it passes around the forward linear movement-reversing region indicated at 40F. This will effectively release the corresponding rod 32 and allow it to ride down the downwardly angularly inclined, gravity-type discharge means, indicated generally at 50, by way of the downwardly inclined discharge side rail means 51 thereof into a retained position at the bottom thereof held by the stop means 52 until manual removal of the rod 32, the basket 36, and the food objects 37 therefrom by means of the handle H to allow the food objects 37 to be removed for use, and to allow new meat patties, or the like, to be replaced in the basket 36 so that the rod 32 can be re-engaged with notched rod-supporting means 45 in the inlet portion or zone 22 of the trough means 21 for another cooking operation. It will be understood that this is a continuous flow operation and will go on all the time as long as the baskets 36 are filled with new food objects and the rods 32 are placed in the support means 45.

In the specific form of the invention illustrated, the sprocket chain linear movement means 38, the sprocket wheels 39, and the rack means 30 on each outer side wall 25B and 26B are substantially covered by protective channel means 49 which, together with the adjacent wall 25B on one side and 26B on the other side, defines the two longitudinally directed top slots S for the reception of the corresponding pinion or spur gears 31 to allow them to roll along the corresponding rack means 30, and also to allow the corresponding notched rod-supporting means 45 to project upwardly from the hidden upper portion 38U of the linear movement sprocket chain or transport means. Each of said channels 49 may be fastened to the corresponding wall 25B and 26B by suitable fastening means, such as the threaded fasteners indicated at F or by any other substantially equivalent fastening means.

Each of the food object-retaining baskets, indicated generally at 36, comprises two similar grillwork panels 53 preferably made of large mesh screen material having square apertures of approximately one-half inch length and width extending therethrough, although not specifically limited to such dimensions. Each of the grillwork panels is joined together by hinge means 54 at one edge of the basket means 36 and is provided with suitable fastener means 55 adjacent the opposite edge of the basket means whereby to allow each basket means 36 to be readily opened into a position such as shown in broken lines in FIG. 11 to receive therein two hamburger patties such as those shown at 37, a plurality of wieners such as eight or ten wieners, or the like, two steaks, or various other food objects, after which the two panels 53 are moved into closed relationship and fastened by the fastener means 55, after which the transverse rod 32, which is affixed to the center of one of the panels 53, is placed in the two notched rod-supporting means 45 at the inlet end or region 22 of the trough means 21 for rotating transport through the cooking zone or region 29 in the manner described hereinbefore.

The fastener, latch, or catch means 55 includes a catch member 55' made of wire and fastened to the outer edge of one of the grillwork panels 53, and said fastener, latch, or catch means 55 also includes a resilient, controllably deflectable, locking member 55'' which has the rear end thereof fastened to the other of said grillwork panels 53 and which has a free end positioned so as to be normally resiliently maintained in engaged locking relationship with respect to the upstanding free end of the other or rigid edge-mounted catch member 55' of said fastening or latch means, generally designated at 55, in the manner clearly shown in solid lines in FIGS. 10 and 12. However, it will be readily understood that the projecting end 55''' of said resiliently deflectable locking member 55'' projects outwardly in a manner such that it can be forcibly pressed against the outside of the protective outer channel means 49 or any other appropriate portion of the outer wall 25B or the discharge edge means 51, and the entire basket can then be forcibly pushed forwardly slightly, which will open the latch means 55. Of course, it should be understood that prior to beginning this operation, the basket means 36 and the latch means 55 are inverted from the position shown in FIG. 10 so that said projecting end 55''' projects downwardly for convenient resilient unlocking deflection thereof in the manner just described. On the other hand, it is possible to open the latch means 55 in a somewhat different manner—that is, by hooking the tip of the other member 55' (when in the above-mentioned inverted position from that shown in FIG. 10) on the inside of the discharge edge means 51 or of the near wall 25B of the trough 21 and by then pulling the entire basket 36 slightly rearwardly, which will also open the latch means 55. Either type of unlatching or unfastening operation of the fastener or latch means 55 can be accomplished by merely moving the entire device while holding the handle H and does not require that a person touch the fastener or latch means 55, which would probably burn his fingers because of the high temperature to which the entire basket 36 and fastener or latch means 55 has been elevated by passing through the cooking zone or region 29.

The U-shaped trough means 21 which, as previously mentioned, is effectively interiorly defined by the false inner liner means best shown at L in FIG. 7, is provided with, and effectively removably normally carries, a perforate false bottom or grate means, indicated generally at 56, which is adapted to carry the refractory means indicated generally at 57, above the burner means indicated at 58, whereby to effectively define what may be broadly termed the heating means 48 referred to hereinbefore, which is adapted to heat the cooking zone or region 29.

As mentioned above, in the specific example illustrated, the perforate false bottom or grate means 56 is of a removable type and comprises a plurality of individually integral sections, each independently separable and removable relative to the other integral sections, with each such section comprising a structure made of crossed bars defining a substantially rectangular grid carried in a rectangular edge frame and, in each case, defining what might, in effect, be called a single egg-crate divider-simulating section surrounded by the corresponding edge framework 59 and, in each case, carrying the plurality of rectangularly oriented and interconnected grid-defining members 60 whereby to together define each individual one of the above-mentioned plurality (actually five in the example illustrated) individually integral and separably removable sections of the combination or composite perforate false bottom or grate means, generally designated at 56, which is adapted to have corresponding side-positioned and end-positioned portions of the five individual edge framework member portions 59 placed in supporting contact with corresponding parts of inwardly directed flange or lip portions 61 carried by the previously-mentioned inner side and end walls 25A, 26A, 27A, and 28A of the false inner liner member generally designated at L, as best shown in FIG. 7, whereby to position said composite perforate false bottom or grate means 56 above the real bottom wall 24A. It should be noted that the primary reason for forming said false bottom or grate means 56 in said plurality of individually integral, but separated, sections is to minimize the heat-caused warping which would tend to become greatly exaggerated and increased if the entire false bottom or grate means 56 comprised one individual unitary structure. Also, the forming of said false bottom or grate means 56 in said plurality of sections facilitates individual removal, repair, and/or replacement of any one thereof which requires same without necessitating the removal and/or replacement of others of said sections.

Also, in the specific example illustrated, the refractory means 57 comprises a plurality of irregularly-shaped members 63 made of a refractory material capable of being heated to extremely high temperatures without damage and, when so heated, adapted to radiate heat therefrom into the cooking zone or region 29 in a manner such as to provide optimum cooking of food objects passed therethrough. The refractory members 63 substantially completely cover the perforate false bottom or grate means 56 and lie directly above the burner means 48 which, in the specific exemplary embodiment illustrated, comprises a longitudinal manifold M extending along the inside wall 26A and provided with a plurality of connection elements 66B adapted to be controllably adjustably connected to corresponding mating connection elements 66A of a corresponding plurality of laterally directed longitudinally spaced combustion burners 58, each positioned below the perforate false bottom or grate means 56 and each having multiple upwardly directed jet apertures 58A therealong and extending across the width direction of the interior of the U-shaped trough 21 and adapted to emit combustible gas which can be ignited therealong whereby to provide heat which will be transferred by radiation, convection, and conduction to the refractory briquets 63 whereby to cause them to receive and absorb said heat from the burning gas and to then radiate heat upwardly into the heating or cooking zone or region 29 in the upper portion of the trough means 21.

The burners 58 can be removed and/or replaced at will and the connection elements 66A and 66B can be effectively connected and disconnected and/or adjusted as desired by inserting a tool such as a screwdriver, or the like, through entry apertures 65 extending completely through the wall 26. It should also be noted that said apertures 65 act as ventilation apertures to facilitate combustion of the gas emitted by the burners 58.

In the specific example illustrated, the manifold M extends through a corresponding opening 74 in the side wall 25 of the trough means 21 and is there connected to pipe means 68 which is connected through valve means 69 to a gas inlet 70 which is adapted to be connected to any suitable source of combustible gas under pressure.

The valve means 69 may be provided with a conventional thermostat element adapted to extend forwardly into a region between the burners 58 whereby to sense the temperature in the cooking element or region 29 and to regulate the flow of combustible gas to the burners 58 so as to maintain said temperature within predetermined limits. This type of structure is well-known in the art and no specific interior structural details thereof are shown since it is believed that such details would be redundant.

Also, igniting pilot means 72 is positioned adjacent the jet orifices 58A of the burners 58 and is connected adjacent to the valve 69 (although it may be directly connected to the gas line inlet 70 in certain cases). This igniting pilot 72 is normally burning and is adapted to light the gas emitted through the jet orifices 58A of burners 58 whenever the manual adjustment knob 73 of the valve 69 is turned on. It should be noted that the manual adjustment knob 73 may have a temperature-indicating scale adapted to cooperate with a pointer or index of the valve 69 whereby to cause the thermostat to maintain the temperature in the cooking region 29 as nearly as possible at the value indicated on said scale by said pointer or index.

It should be noted that the side wall 25 has an opening 74 thereinto in which one or more underlying removable grease-catching tray means may be mounted for the purpose of catching any grease drippings, or the like, which may escape from the rotating self-basting meat food objects 37 and which may actually penetrate or pass through the heated refractory members 63 and the burners 58.

It should be noted that the driving means 41, comprising the motor 44, best shown in FIG. 9, is of a variable-speed type adapted to have the output shaft's speed of rotation modified by movement of the operating or adjustment lever 85. This may be accomplished by having said lever electrically control the speed of rotation of the motor 44 or by having it vary the effective gear ratio of the variable gearing 43, the interior structure of which is not shown since such variable ratio gear structures and/or power transmissions are well-known in the art and since the precise interior detail thereof comprises no part of the present invention. Indeed, any such variable gearing arrangement or variable power transmission arrangement of an electrical, magnetic, frictional, or other type may be employed.

In any event, irrespective of what type of variable power transmission means 43 is employed, its purpose is to change the rate of linear travel of the endless-loop sprocket chain means 38 in a manner such as to correspondingly change the rate at which the transverse rods 32, the baskets 36, and the meat food objects 37 move through the heated cooking region or zone 29 (as previously described).

This modification of travel time through the heated cooking zone or region 29 will be accomplished by adjustment of the lever 85 in a manner such as to provide exactly the right cooking time for a particular type of meat food object. For example, steaks will require greater cooking time and/or greater cooking temperatures (which can be provided by adjustment of the lever 85 and/or the previously described regulator means 69). This principle can be adapted so as to make the apparatus suitable for cooking virtually any desired type of food object by appropriate adjustment of heat and/or appropriate adjustment of cooking time.

FIG. 13 illustrates a modification of the driving means shown at 41 in the first form of the invention. In this modification, said driving means and similar parts of the apparatus are indicated by similar numbers, primed, however.

In this slight variation, the driving means 41' includes variable means for controlling the speed of the driving motor means 44'. This speed-controlling means is designated generally by the reference numeral 86.

The speed controlling means 86 may assume the form shown in FIG. 13 wherein it comprises a conventional rheostat type of speed control for a DC motor, or may comprise the type shown in FIG. 14 wherein it comprises a controllably adjustable variable frequency oscillation generator means 87 which may operate from either AC or DC and which will produce a variable frequency output for correspondingly controlling the speed of an alternating current motor of the synchronous type, induction type, or various other types which rotate at a speed which is a function of the frequency of the applied AC.

Other types of speed control means employing speed governors, error-sensing feedback means, either with or without servo-mechanisms, and the like, may be employed in accordance with well-known principles. The specific details of such arrangements, which are well-known in the art, do not comprise the essential features of the present invention and, therefore, are not specifically illustrated and described in detail.

Numerous modifications and variations of the present invention within the basic scope and/or teachings of the broad inventive concept of the present invention will occur to those skilled in the art and are intended to be included and comprehended herein as fully as if specifically illustrated and described.

For example, it is quite apparent that various other means for holding virtually any type of food object with respect to the transverse supporting rods may be employed. The food may be spitted thereon or may be retained in mounting baskets, containers, or the like, of various types.

The heating means may be modified substantially as may the linear movement or transporting means.

Also, the rack and engaging gear means may be modified as to number, position, and structural arrangement. In certain forms of the invention, the effect of the rack and engaging gear means may be provided by frictional engagement.

The heating means may be of a number of different types employing any of various different fuels, or may be electrical in nature.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:
1. A continuous flow apparatus for receiving, transporting, applying heat to, and discharging a plurality of objects, comprising: supporting framework means defining a longitudinal horizontally directed trough means having an object-receiving inlet end portion and an object-discharging outlet end portion longitudinally horizontally spaced apart; rotary and linear movement transport means including a plurality of object-supporting transverse rods each having aligned opposite end portions and a parallel central offset portion provided with and carrying an object-retaining basket means centrally longitudinally aligned with said aligned opposite end portions of said transverse rod, each transverse rod being provided with rotary engagement means; said trough means having longitudinally directed effective rack means positioned for rotatably supporting engagement with said rotary engagement means of said transverse rods; said rotary and linear movement transport means also comprising linear movement engagement means and coupling means for effectively removably coupling same with respect to said transverse rods at longitudinally horizontally spaced locations along the length of said trough means for continually driving same in a direction from said inlet end portion toward said outlet end portion of said trough means whereby to rotatably horizontally transport the plurality of longitudinally spaced transverse rods in sequence from said inlet end portion to said outlet end portion of said trough means; said linear movement engagement means comprising an endless-loop sprocket chain means including a pair of laterally spaced similar endless-loop sprocket chains provided with driving means comprising spaced sprocket wheel means including at least two laterally spaced sprocket wheels coupled respectively with respect to the corresponding ones of said two endless-loop sprocket chains and provided with coupling means and driving motor means effectively coupling said sprocket wheel means and said driving motor means for rotating same and driving each of said two laterally spaced endless-loop sprocket chains of said endless-loop sprocket chain means with a top horizontally directed loop portion of each of same being similarly horizontally driven in a direction from said inlet end portion toward said outlet end portion of said trough means, each of said endless-loop sprocket chains of said endless-loop sprocket chain means passing, in the direction of movement thereof, forwardly, downwardly, and rearwardly around a corresponding laterally spaced forward one of said sprocket wheels whereby to define a linear movement reversing discharge end portion thereof adjacent to said outlet end portion of said trough means; said coupling means carried by said sprocket chain means for effectively coupling same with respect to the transverse rods comprising a plurality of notched rod-supporting bifurcated paired finger means carried at similar longitudinally and laterally spaced locations by each of said two laterally spaced sprocket chains of said sprocket chain means, with each of said transversely spaced pairs of said finger means being open at the ends most remote from the sprocket chains carrying same and rotatably supporting the corresponding transversely spaced portions of the corresponding transverse rod therein as it is transported in a direction from said inlet end portion toward said outlet end portion of said trough means; each transversely spaced pair of said finger means being carried by said transversely spaced sprocket chains for simultaneous tilting and inverting movement thereof as said sprocket chain reaches said outlet end portion of said trough means and effectively becomes and defines said linear movement reversing discharge end portion of said endless-loop sprocket chain means; and discharge means positioned adjacent to said outlet end portion of said trough means and effectively disengageably receiving, in sequence, each of said transverse rods from the corresponding transversely spaced finger means effectively coupling same to the corresponding transversely spaced sprocket chains at said outlet end portion of said trough means where said finger means are invertingly tilted for discharging said rod into a position for manual removal therefrom, said discharge means including downwardly angularly inclined, gravity-type, laterally spaced, discharge edges comprising extensions of corresponding top edges of said longitudinal horizontally directed trough means adapted to receive and rollably discharge angularly forwardly and downwardly each transverse rod as it is released by said corresponding inverted tilted finger means carried by said pair of laterally spaced sprocket chains at the linear movement reversing discharge end portion thereof; and heating means positioned within the trough means below the level of the transporting movement of said transverse rods as they are moved in a direction from said inlet end portion toward said outlet end portion of said trough means by said linear movement engagement means, said heating means comprising combustion burner means provided with an inlet portion adapted to be connected to a suitable source of combustible fuel, said heating means including refractory means positioned above the combustion burner means and adapted to receive and absorb heat therefrom and to then radiate heat upwardly into a heating region through which said object-retaining portions of said transverse rods pass during transporting movement in a direction from said inlet end portion toward said outlet end portion of said trough means, the interior of said trough means being provided with an effective perforate false bottom supporting said refractory means above said burner means, said refractory means comprising a plurality of members of a refractory material.

2. Apparatus as defined in claim 1, wherein each of said laterally spaced, effectively flexible endless-loop sprocket chains has an upper portion of said endless-loop sprocket chain provided with upwardly directed horizontal longitudinal support edge means continuously longitudinally horizontally rollably slidably engaging the underside of the upper portion of said sprocket chain along substantially the complete length thereof for positively supporting the entire length thereof in a readily horizontally slidable manner.

3. Apparatus as defined in claim 2, wherein said coupling means and said driving motor means are effectively provided with controllably adjustable means for controlling the speed of movement of said endless-loop sprocket chain means.

4. Apparatus as defined in claim 2, wherein said horizontal longitudinal support edge means comprises an upwardly directed longitudinal horizontal track member carrying thereon an inverted substantially U-shaped longitudinal anti-friction extrusion member of plastic material having a maximum wear-resistance characteristic and a minimum coefficient of friction.

5. Apparatus as defined in claim 1, wherein each of said basket means is provided with resiliently openable fastener and latch means having a projecting portion which can be forcibly deflected by contact with any rigid object whereby to open the basket means without requiring manual or digital contact with said fastener and latch means.

References Cited
UNITED STATES PATENTS

| | | |
|---|---|---|
| 2,142,390 | 1/1939 | Zerr _____ 99—420 |
| 2,259,073 | 10/1941 | McGlaughlin _____ 99—427 |
| 2,585,364 | 2/1952 | Wright et al. |
| 2,655,096 | 10/1953 | Ebin _____ 99—420 |
| 2,785,884 | 3/1957 | Stout _____ 99—443 X |
| 2,790,434 | 4/1957 | Del Francia. |
| 2,881,695 | 4/1959 | Di Pietro _____ 99—446 |
| 2,895,408 | 7/1959 | Glenny _____ 99—427 |

WALTER A. SCHEEL, *Primary Examiner.*

S. P. FISHER, *Assistant Examiner.*